(12) United States Patent
Hanif et al.

(10) Patent No.: US 7,716,079 B2
(45) Date of Patent: *May 11, 2010

(54) FEEDBACK CANCELLATION IN A NETWORK-BASED TRANSACTION FACILITY

(75) Inventors: Amjad Hanif, Santa Clara, CA (US); Brian Burke, San Jose, CA (US); Jeff Taylor, Los Altos, CA (US)

(73) Assignee: eBay Inc., San Jose, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 10/749,736

(22) Filed: Dec. 30, 2003

(65) Prior Publication Data

US 2005/0114199 A1 May 26, 2005

Related U.S. Application Data

(60) Provisional application No. 60/524,348, filed on Nov. 20, 2003.

(51) Int. Cl.
*G06F 17/30* (2006.01)
(52) U.S. Cl. ....................................................... 705/10
(58) Field of Classification Search .................... 705/10
See application file for complete search history.

(56) References Cited

U.S. PATENT DOCUMENTS

| | | | |
|---|---|---|---|
| 5,285,496 A | 2/1994 | Frank et al. | |
| 5,583,763 A | 12/1996 | Atcheson et al. | |
| 5,659,366 A | 8/1997 | Kerman | |
| 5,669,877 A | 9/1997 | Blomquist | |
| 5,678,041 A | 10/1997 | Baker et al. | |
| 5,706,493 A | 1/1998 | Sheppard, II | |
| 5,706,507 A | 1/1998 | Schloss | |
| 5,708,829 A | 1/1998 | Kadashevich et al. | |
| 5,732,954 A | 3/1998 | Strickler et al. | |
| 5,737,479 A | 4/1998 | Fujinami | |
| 5,754,939 A | 5/1998 | Herz et al. | |
| 5,774,121 A | 6/1998 | Stiegler | |
| 5,778,135 A | 7/1998 | Ottesen et al. | |

(Continued)

FOREIGN PATENT DOCUMENTS

WO     WO 01/61601 A1 * 8/2001

(Continued)

OTHER PUBLICATIONS eBay, eBay Feedback Removal Policy, Jun. 19, 2000 [online—Internet Archive WaybackMachine—retrieved on Feb. 14, 2005—URL: http://pages.ebay.com/help/community/fbremove. html].*

(Continued)

*Primary Examiner*—Susanna M Diaz
(74) *Attorney, Agent, or Firm*—Schwegman, Lundberg & Woessner, P.A.

(57) ABSTRACT

A method and apparatus for canceling feedback in a network-based transaction facility are described. In one embodiment, the method includes receiving a request to cancel feedback pertaining to a transaction in a network-based transaction facility from a first party to the transaction, determining whether feedback cancellation criteria are satisfied, and canceling the feedback pertaining to the transaction if the feedback cancellation criteria are satisfied.

26 Claims, 27 Drawing Sheets

U.S. PATENT DOCUMENTS

| | | | |
|---|---|---|---|
| 5,781,246 | A | 7/1998 | Alten et al. |
| 5,787,253 | A | 7/1998 | McCreery et al. |
| 5,790,426 | A | 8/1998 | Robinson |
| 5,793,027 | A | 8/1998 | Baik |
| 5,799,304 | A | 8/1998 | Miller |
| 5,809,482 | A | 9/1998 | Strisower |
| 5,810,771 | A | 9/1998 | Blomquist |
| 5,822,123 | A | 10/1998 | Davis et al. |
| 5,828,419 | A | 10/1998 | Bruette et al. |
| 5,830,068 | A | 11/1998 | Brenner et al. |
| 5,832,472 | A | 11/1998 | Sheppard, II |
| 5,845,266 | A | 12/1998 | Lupien et al. |
| 5,848,396 | A | 12/1998 | Gerace |
| 5,862,230 | A | 1/1999 | Darby |
| 5,867,799 | A | 2/1999 | Lang et al. |
| 5,870,744 | A | 2/1999 | Sprague |
| 5,872,850 | A | 2/1999 | Klein et al. |
| 5,970,469 | A | 10/1999 | Scroggie et al. |
| 6,112,186 | A | 8/2000 | Bergh et al. |
| 6,134,548 | A | 10/2000 | Gottsman |
| 6,327,574 | B1 | 12/2001 | Kramer et al. |
| 6,352,479 | B1 | 3/2002 | Sparks, II |
| 6,477,509 | B1 | 11/2002 | Hammons et al. |
| 6,484,153 | B1 | 11/2002 | Walker et al. |
| 6,697,824 | B1 | 2/2004 | Bowman-Amuah |
| 6,810,408 | B1 | 10/2004 | Bates et al. |
| 7,124,112 | B1 | 10/2006 | Guyan et al. |
| 7,428,505 | B1 | 9/2008 | Levy et al. |
| 2002/0078152 | A1 | 6/2002 | Boone |
| 2004/0128155 | A1* | 7/2004 | Vaidyanathan et al. ......... 705/1 |
| 2004/0128224 | A1* | 7/2004 | Dabney et al. ................ 705/37 |
| 2005/0192958 | A1 | 9/2005 | Widjojo et al. |
| 2006/0064343 | A1 | 3/2006 | Burke et al. |

FOREIGN PATENT DOCUMENTS

| | | |
|---|---|---|
| WO | WO-0165338 A2 | 9/2001 |
| WO | WO-05052835 A1 | 6/2005 |

OTHER PUBLICATIONS

SquareTrade, How SquareTrade's Dispute Resolution Can Help Resolve Feedback Disputes, Mar. 12 & Jun. 18, 2001, & Aug. 8, 2002 [online—Internet Archive WaybackMachine—retrieved on Feb. 14, 2005—URL: http://www.squaretrade.com/eb/ebay_nf_020801.html.*

Entry for "withdraw" from Merriam-Webster's Collegiate® Thesaurus, p. 859, © 1988.*

"International Search Report and Written Opinion", Received in related matter PCT/US04/38096, (Mar. 16, 2005), 15 pgs.

"Ebay—What is Mutual Feedback Withdrawal?", http://pages.ebay.com/help/feedback/questions/mutual-withdrawal.html, (Accessed Apr. 3, 2006).

Chicago Tribune, "Amazon.com expands into toys, electronics", *Chicago Tribune*, (Jul. 14, 1999),3;1.

Guglielmo, Connie , "BizRate Lets Consumers Rate Sites", *Interactive Week*, 4(22), (Aug. 4, 1997).

MTB Review, "http://www.mtbr.com", http://www.mtbr.com, The attached mtbr.pdf which includes screen shots from a Mountain Biking Resource Review web site taken from the Wayback Machine Internet Archive located at http://www.archive.org/web/web.php. ,(Archived Jan. 25, 1997).

Wolverton, Troy , "Productopia launches product review site", *CNET News.com*, (Jul. 21, 1999).

"U.S. Appl. No. 09/503,960, Advisory Action mailed Jul. 30, 2004", 4 pgs.

"U.S. Appl. No. 09/503,960, Final Office Action mailed Apr. 13, 2006", 20 pgs.

"U.S. Appl. No. 09/503,960, Final Office action mailed Apr. 22, 2003", 19 pgs.

"U.S. Appl. No. 09/503,960, Final Office Action mailed Apr. 27, 2004", 21 pgs.

"U.S. Appl. No. 09/503,960, Non Final Office Action mailed Sep. 13, 2005", 21 pgs.

"U.S. Appl. No. 09/503,960, Non Final Office Action mailed Nov. 19, 2003", 23 pgs.

"U.S. Appl. No. 09/503,960, Non Final Office Action mailed Nov. 20, 2002", 16 pgs.

"U.S. Appl. No. 09/503,960, Non Final Office Action mailed Dec. 22, 2004", 18 pgs.

"U.S. Appl. No. 09/503,960, Non Final Office Action mailed May 22, 2002", 19 pgs.

"U.S. Appl. No. 09/503,960, Prelimiary Amendment filed Aug. 20, 2003", 13 pgs.

"U.S. Appl. No. 09/503,960, Response filed Jan. 13, 2006 to non-final office action mailed Sep. 13, 2005", 18 pgs.

"U.S. Appl. No. 09/503,960, Response filed Feb. 19, 2004 to Non Final Office Action mailed Nov. 19, 2003", 14 pgs.

"U.S. Appl. No. 09/503,960, Response filed Feb. 20, 2003 to non-final office action mailed Nov. 20, 2002", 11 pgs.

"U.S. Appl. No. 09/503, 960, Response filed Jun. 15, 2005 to non final office action mailed Dec. 22, 2004", 17 pgs.

"U.S. Appl. No. 09/503,960, Response filed Jun. 23, 2003 final office action mailed Apr. 22, 2003", 9 pgs.

"U.S. Appl. No. 09/503,960, Response filed Jun. 25, 2004 to final office action mailed Apr. 27, 2004", 13 pgs.

"U.S. Appl. No. 09/503,960, Response filed Aug. 19, 2002 to non final office action mailed May 22, 2002", 12 pgs.

"U.S. Appl. No. 11/241,008, Preliminary Amendment mailed 12-8", 3 pgs.

"European Application Serial No. 04519526.7, Office Action mailed Feb. 4, 2009", 6 pgs.

"European Application Serial No. 04819526.7, European Search Report mailed Jun. 17, 2008", 3 pgs.

"International Application Serial No. PCT/US04/38096, International Search Report mailed Mar. 16, 2005", 5 pgs.

"International Application Serial No. PCT/US04/38096, Written Opinion mailed Mar. 16, 2005", 8 pgs.

Abdul-Rahman, A., et al., "Supporting Trust in Virtual Communities", *Proceedings of the 33rd Hawaii International Conference on System Sciences*, 6(6), (2000), 1-25.

Abdul-Rahman, Alfarez, et al., "Using Recommendations for Managing Trust in Distributed Systems", *IEEE Malaysia International Conference on Communication*, (1997), 1-7.

Aberer, Karl, et al., "Managing Trust in a Peer-2-Peer Information System", *Proceedings of the tenth international conference on Information and knowledge management*, Atlanta, Georgia, USA, (2001), 310-317.

Carter, Jonathan, et al., "Reputation Formalization Within Information Sharing Multiagent Architectures", *Computational Intelligence*, 2(5), (2002), 45-64.

Dellarocas, Chrysanthos, "Mechanisms for coping with unfair ratings and discriminatory behavior in online reputation reporting systems", *Proceedings of the Twenty First International Conference on Information Systems*, (2000), 520-525.

Dellarocas, Chrysanthos, "The Design of Reliable Trust Management Systems for Electronic Trading Communities", *Working Paper, Sloan School of Managment, Massachusetts Institute of Technology*, (2001), 1-45.

Donath, J., "Identity and Deception in the Virtual Community", *In Kollock, P. and Smith, M. (Eds.) Communities in Cyberspace: Perspectives on New Forms of Social Organization. Berkeley: University of California Press*, MIT Media Lab, (1997), 1-25.

Friedman, Eric, "Robust Social Norms in Bargains and Markets", *Draft, Rutgers University*, (1999), 1-23.

Friedman, Eric, et al., "The Social Cost of Cheap Pseudonyms", *Journal of Economics and Management Strategy*, 10(2), (2000), 173-199.

Mui, L., et al., "Ratings in Distributed Systems: A Bayesian Approach", *Proceedings of the Workshop on Information Technologies and Systems (WITS)*, (2001), 1-7.

Ono, C., et al., "Trust-Based Facilitator for e-Partnerships", *Proceedings of the Fifth International Conference on Autonomous Agents*, (2001), 108-109.

Schneider, Jay, et al., "Disseminating Trust Information in Wearable Communities", *2nd International Symposium on Handheld and Ubitquitous Comput- 10 ing (HUC2K)*, (2000), 1-5.

Venkatraman, Mahadevan, et al., "Trust and Reputation Management in a Small-World Network", *Proceedings of the Fourth International Conference on MultiAgent Systems (ICMAS-2000)*, 1-2.

Yu, Bin, et al., "A Social Mechanism of Reputation Management in Electronic Communities", *Proceedings of the 4th International Workshop on Cooperative Information Agents IV, The Future of Information Agents in Cyberspace*, (2000), 154-165.

Zacharia, Giorgos, et al., "Collaborative Reputation Mechanisms in Electronic Marketplaces", *Proceedings of the 32nd Hawaii International Conference on System Sciences*, (1999), 1-7.

\* cited by examiner

FIG. 4

FEEDBACK TABLE

| USER ID | TOTAL SCORE | TOTAL NEGATIVE | TOTAL POSITIVE | NO. OF RETRACTIONS |
|---------|-------------|----------------|----------------|---------------------|
| 74 | 76 | 78 | 80 | 82 |

FIG. 5

FEEDBACK DETAILS TABLE

| ITEM NO. | COMMENT | TYPE | DATA | RESPONSE | REBUTTAL | FEEDBACK PROVIDER (USER ID) | COMMENTEE (USER ID) | WITHDRAWAL DATE |
|----------|---------|------|------|----------|----------|------------------------------|----------------------|------------------|
| 104 | 106 | 108 | 110 | 112 | 114 | 116 | 118 | 120 | home | register | sign in | services | site map | help

| Browse | Search | Sell | | Community | Powered By IBM |

Home > Services > Feedback Forum > Mutual Feedback Withdrawal

Feedback Forum: Mutual Feedback Withdrawal                    ⑦ Need Help?

While feedback is a permanent part of a member's reputation, ratings left for a particular transaction may be withdrawn through mutual feedback withdrawal. For this to happen, both members must agree that feedback left is no longer appropriate, and agree to withdraw using this process. Withdrawn feedback remains in both members' profiles but is no longer counted in the feedback score. Learn more.

Before initiating this process, please be sure to contact the other member to resolve any disagreements.

Enter an item number:

[          ]

[Continue>]

―――――――――――――――――――――――――――――――――

Announcements | Register | Safe Trading Tips | Policies | Feedback Forum |

[TRUSTe site privacy statement]

| | |
|---|---|
| Buyer: | funnygirl (88 ★ ) |
| Item: | Snoopy Pez Dispenser Free S&H with BIN (123456789) |
| Date/Time: | Sep-24-03 12:35:18 PDT |
| Feedback you left: | (No feedback comment has been left.) |
| Feedback received: | ● Never shipped the item! Bad Seller |
| | |
| Buyer: | funnygirl (88 ★ ) |
| Item: | Snoopy Pez Dispenser Free S&H with BIN (123456789) |
| Date/Time: | Sep-23-03 02:34:17 PDT |
| Feedback you left: | (No feedback comment has been left.) |
| Feedback received: | ● Never shipped the item! Bad Seller |

FIG. 13B

| | home | register | sign in | services | site map | help |
|---|---|
| Browse | Search | Sell | | Community | Powered By IBM |

Home > Services > Feedback Forum > Mutual Feedback Withdrawal

Feedback Forum: Mutual Feedback Withdrawal  ⓘ Need Help?

Important: Please read the following before continuing with your request.

1. Both members must complete this process within 90 days from the end of the listing or 30 days from the date the feedback was left.
2. The ratings that you and the other member left will both be withdrawn at the same time. After withdrawal, no additional feedback will be allowed for this item.
3. Withdrawn feedback comments remain visible in both members' profiles, but are no longer counted in the feedback score. See example.
4. will review excessive requests for feedback withdrawal for compliance with our feedback policies.
5. Once you submit your request, it cannot be retracted or canceled. If the oth member delcines the request or does not respond, the feedback will remain unchanged.

[Send request]  Cancel request

---

Announcements | Register | Safe Trading Tips | Policies | Feedback Forum |

FIG. 14 home | register | sign in | services | site map | help

| Browse | Search | Sell | | Community | Powered By IBM |

Home > Services > Feedback Forum > Mutual Feedback Withdrawal

Feedback Forum: Your request has been submitted  Need Help?

Your request to mutually withdraw feedback for item 123456789 has been sent to funnygirl. This request will remain active for 90 days from the end of the listing or 30 days from the date the feedback was left.

Where would you like to go next?
My Page
Feeback Forum
Facility Homepage

Announcements | Register | Safe Trading Tips | Policies | Feedback Forum | reviewed by TRUSTe
site privacy statement

FIG. 15A home | register | sign in | services | site map | help

| Browse | Search | Sell | | Community |

Powered By IBM

Home > Services > Feedback Forum > Mutual Feedback Withdrawal

Feedback Forum: Your request has been canceled  ⓘ Need Help?

You have canceled your request for mutual feedback withdrawal for item 123456789.

Where would you like to go next?
    Mutual Feedback Withdrawl
    My Page
    Feeback Forum
    Facility Homepage Announcements | Register | Safe Trading Tips | Policies | Feedback Forum | reviewed by TRUSTe
site privacy statement

FIG. 15B home | register | sign in | services | site map | help ⓘ

| Browse | Search | Sell | | Community | Powered By IBM |

Home > Services > Feedback Forum > Mutual Feedback Withdrawal

Feedback Forum: Mutual Feedback Withdrawal                    ⓘ Need Help?

While feedback is a permanent part of a member's reputation, ratings left for a particular transaction may be withdrawn through mutual feedback withdrawal. For this to happen, both members must agree that feedback left is no longer appropriate, and agree to withdraw using this process. Withdrawn feedback remains in both members' profiles but is no longer counted in the feedback score. Learn more.

Before completing this process, be sure to contact the other member to resolve any disagreements.

Your trading partner requested mutual feedback withdrawal for the following item:
123456789

[See details]

---

Announcements | Register | Safe Trading Tips | Policies | Feedback Forum | reviewed by
TRUSTe
site privacy statement

FIG. 16

FIG. 17 home | register | sign in | services | site map | help

| Browse | Search | Sell | | Community | Powered By IBM |

Home > Services > Feedback Forum > Mutual Feedback Withdrawal

Feedback Forum: Mutual Feedback Withdrawal    ⑦ Need Help?

Your trading partner has agreed to mutual feedback withdrawal for the following item and requested you to do the same. If you agree to this request, feedback will be withdrawn and will not count towards the feedback scores of you and your trading partner; however, the feedback comments will be visible in both members' profiles. Learn more Please review the information below:

---

Seller: dreamlife90 (3528 ★ )
Item: Snoopy Pez Dispenser Free S&H with BIN (123456789)
Date/Time: Sep-24-03 12:35:18 PDT
Feedback you left: ⊖ Never shipped the item! Bad Seller Reply left by dreamlife90: Shipment was delayed by UPS. Arrived two days later on Sep 26th.

Feedback you received: ⊚ Left negative feedback prematurely.

[Continue>]   Ignore request

---

Announcements | Register | Safe Trading Tips | Policies | Feedback Forum |

TRUSTe
site privacy statement

FIG. 18 home | register | sign in | services | site map | help ⓘ

| Browse | Search | Sell | | Community | Powered By IBM |

Home > Services > Feedback Forum > Mutual Feedback Withdrawal

Feedback Forum: Your feedback has been withdrawn ⓘ Need Help?

You and dreamlife90 have mutually withdrawn feedback for item 123456789. A confirmation email has been sent to both of you.

Please note: It may take up to 24 hours for the feedback scores to be updated.

Where would you like to go next?

My Page
Feeback Forum
Facility Homepage

Announcements | Register | Safe Trading Tips | Policies | Feedback Forum | reviewed by
TRUSTe
site privacy statement

Feedback Withdrawal Request for Item 123456789

Dear dreamlife90,

Your request to withdraw feedback for item 123456789 has been sent to member funnygirl. Your trading partner must also agree and complete this request before the feedback will be withdrawn and scores updated for both members.

Please note: If the member does not agree or does not complete the form within 90 days of the transaction or within 30 days of the date the feedback was left, the feedback for this transaction will remain unchanged.

Item/Feedback Information

| | |
|---|---|
| Buyer: | funnygirl (88 ★) |
| Item: | Snoopy Pez Dispenser Free S&H with BIN (123456789) |
| Date/Time: | Sep-24-03 12:35:18 PDT |
| Feedback you left: | ⊙ Left negative feedback prematurely. |
| Feedback you received: | ⊖ Never shipped the item! Bad Seller |
| | Reply left by dreamlife90: Shipment was delayed by UPS. Arrived two days later on Sep 26th. |
| Message to buyer: | Lorem ipsum dolor sit amet, consectetuer adipiscing elit. Morbi et est sed diam volutpat congue. Suspendisse turpis urna, venenatis eu, posuere at, gravida vel, diam. |

FIG. 21

Feedback Withdrawal Request for Item 123456789

Dear funnygirl, dreamlife90 has filed a request to mutually withdraw feedback for the transaction shown below. allows members to withdraw feedback for a transaction if they both agree it is no longer appropriate.

If you agree to this request, the feedback you received AND any feedback you left for this transaction will be withdrawn at the same time. Withdrawn feedback remains in both members' profiles but is no longer counted in the feedback score. If you have not left feedback for this transaction, you may still agree to this request, but you will not be able to leave feedback at a later date.

> If you agree, please fill out the feedback withdrawal form:
>
> If you disagree, no action is required. The feedback for this transaction will remain unchanged.

Please note: To withdraw feedback, you must complete the online form within 90 days from the end of the listing or within 30 days of the date the feedback was left, whichever is longer.

Item/Feedback Information

| | |
|---|---|
| Seller: | dreamlife90 (3528 ★) |
| Item: | Snoopy Pez Dispenser Free S&H with BIN (123456789) |
| Date/Time: | Sep-24-03 12:35:18 PDT |
| Feedback you left: | ● Never shipped the item! Bad Seller |
| | Reply left by dreamlife90: Shipment was delayed by UPS. Arrived two days later on Sep 26th. |
| Feedback you received: | ◉ Left negative feedback prematurely. |
| Message from seller: | Lorem ipsum dolor sit amet, consectetuer adipiscing elit. Morbi et est sed diam volutpat congue. Suspendisse turpis urna, venenatis eu, posuere at, gravida vel, diam. |

FIG. 22

Feedback Withdrawal Request for Item 123456789

Dear <userID>,

Your request to withdraw feedback for item 123456789 has been successfully completed. The feedback comment will now be marked as withdrawn and feedback scores updated.

Please note: It may take up to 24 hours for the withdrawal to be reflected in your feedback score.

FIG. 23

| | home | register | sign in | services | site map | help ⓘ |
| Browse | Search | Sell | | Community | powered by [XYZ] |

← Back to your last item    Home > Services > Feedback Forum > Member Profile

Member Profile: dreamlife90 (3528 ★) ⓨ 📷 (stores) me

| Feedback Score: | 3528 | Recent Ratings: | | | | Member since: Jul 1997 |
|---|---|---|---|---|---|---|
| Positive Feedback: | 99.8% | | Past Month | Past 6 Months | Past 12 Months | Location: United States |
| Members who left a positive: | 3531 | ⊕ positive | 392 | 1833 | 2805 | • ID History |
| Members who left a negative: | 3 | ⊖ neutral | 1 | 1 | 1 | • Items for Sale |
| All positive feedback received: | 6587 | ⊖ negative | 1 | 1 | 1 | • Visit my Store |
| | | | | | | • Learn more About Me |

Learn about what these numbers mean.    Bid Retractions (Past 6 months): 2    Contact Member

(2406 bracket indicates the summary box above)

All Feedback Received | From Buyers | From Sellers | Left for Others    ⓘ Need Help?

6593 feedback received by dreamlife90 (6 mutually withdrawn)    2404    Page 1 of 30

| Comment | From | Date/Time | Item # |
|---|---|---|---|
| ⊕ Excellent seller, fast emails and shipment. AAA+++ | Buyer pharaoh4 (1408 ★) | Feb-25-03 14:35 | 2157396891 |
| ⊕ ABSOLUTELY THE PERFECT EBAYER. SENT IMMEDIATELY!!! JUST WONDERFUL. tHANKS! | Buyer jmixon10 (1) ⚡ | Feb-25-03 12:35 | 2157396892 |
| ⊕ Very fast transaction, quick delivery. | Buyer crazyguy (224 ☆) | Feb-25-03 12:00 | 2157396893 |
| ⊕ An excellent customer, thank you for your business!!! | Seller dddaddydee (19 ☆) | Feb-25-03 10:25 | 2157396894 |
| ⊖ Would not trade again, never shipped my item! Reply by dreamlife90: I emailed you 5 times but no response. Don't sell to this person. Follow-up by katelovespez: I didn't get any emails. | Buyer katelovespez (656 ☆) | Feb-25-03 02:35 Feb-28-03 17:00 Feb-29-03 05:40 | 2157396895 |
| ⊕ Fast payment! Excellent ...hope do business again AA+++=^o^= | Seller bestvalue (251 ☆) no longer a registered user | Feb-24-03 19:22 | 2157396888 |
| ⊕ Thanks again! Always a pleasure. | Buyer littlebitothis (224 ☆) | Feb-24-03 18:55 | 2157396889 |
| ⊕ Shipping took too long. But offered me refund. | Buyer imintexas (19 ☆) | Feb-24-03 17:40 | 2157396890 |
| ⊕ Another good deal! Business was a pleasure. | Buyer winthisnow (656 ☆) | Feb-24-03 17:00 | 2157396891 |
| Never shipped the item! Bad Seller! Reply by dreamlife90: Shipment was delayed by UPS. Arrived 2 days later on Feb 26th. Withdrawn: Buyer and seller mutually agreed to withdraw feedback for this item. Learn more. | Buyer funnygirl (88 ★) | Feb-24-03 12:35 Feb-26-03 18:00 Mar-01-03 09:38 | 2157396892 |
| ⊕ Good communication and packaging. | Buyer dealseeker (1408 ★) | Feb-24-03 11:22 | 2157396893 |
| ⊕ Buy from this guy! He is the best! | Buyer iloveebay (251 ☆) | Feb-24-03 09:55 | 2157396894 |

FIG. 24

FEEDBACK CANCELLATION IN A NETWORK-BASED TRANSACTION FACILITY

RELATED APPLICATION

This application is related to and claims the benefit of U.S. Provisional Patent application Ser. No. 60/524,348 filed Nov. 20, 2003, which is hereby incorporated by reference.

FIELD OF THE INVENTION

The present invention relates generally to the field of e-commerce and, more specifically, to the cancellation of feedback received from users of a network-based transaction facility.

BACKGROUND OF THE INVENTION

In addition to access convenience, one of the advantages offered by network-based transaction facilities (e.g., business-to-business, business-to-consumer and consumer-to-consumer Internet marketplaces and retailers) and on-line communities is that participants within such facilities or communities may provide feedback to the facility, to other users of the facility and to members of an on-line community regarding any number of topics.

For users of a network-based transaction facility, such as an Internet-based auction facility, feedback regarding other users is particularly important for enhancing user trust of the transaction facility. Indeed, a history of positive feedback for a trader that routinely uses an Internet-based auction facility may be particularly valuable and useful in providing other traders with a degree of confidence regarding a specific trader. Accordingly, a positive feedback history may establish the credibility and trustworthiness of a particular trader within an on-line trading community. Similarly, a history of negative feedback may discourage other traders from transacting with a specific trader.

SUMMARY OF THE INVENTION

According to one aspect of the present invention, an exemplary method includes receiving a request to cancel feedback pertaining to a transaction in a network-based transaction facility from a first party to the transaction, determining whether feedback cancellation criteria are satisfied, and canceling the feedback pertaining to the transaction if the feedback cancellation criteria are satisfied.

BRIEF DESCRIPTION OF THE DRAWINGS

The present invention is illustrated by way of example and not limitation in the figures of the accompanying drawings, in which like references indicate similar elements and in which:

FIG. 4 is a diagrammatic representation of an exemplary feedback table of the database illustrated in FIG. 2.

FIG. 5 is a diagrammatic representation of an exemplary feedback details table of the database illustrated in FIG. 2.

FIGS. 10-24 illustrate exemplary user interfaces.

DETAILED DESCRIPTION

A method and system for canceling feedback in a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
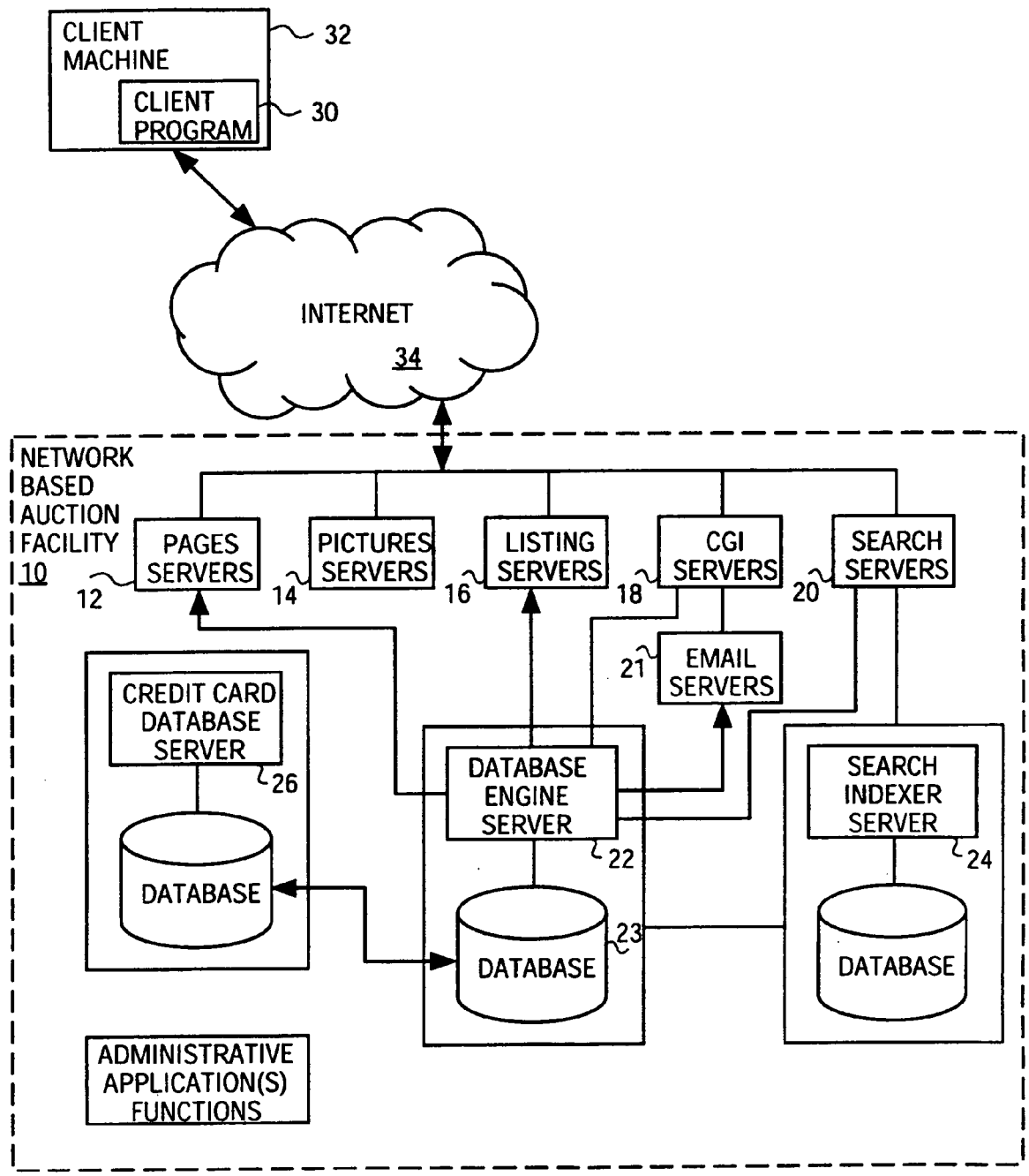
FIG. 1 is a block diagram illustrating an exemplary network-based transaction facility in the form of an internet-based auction facility.

FIG. 1 is block diagram illustrating an exemplary network-based transaction facility 10 that includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database 23.

The facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
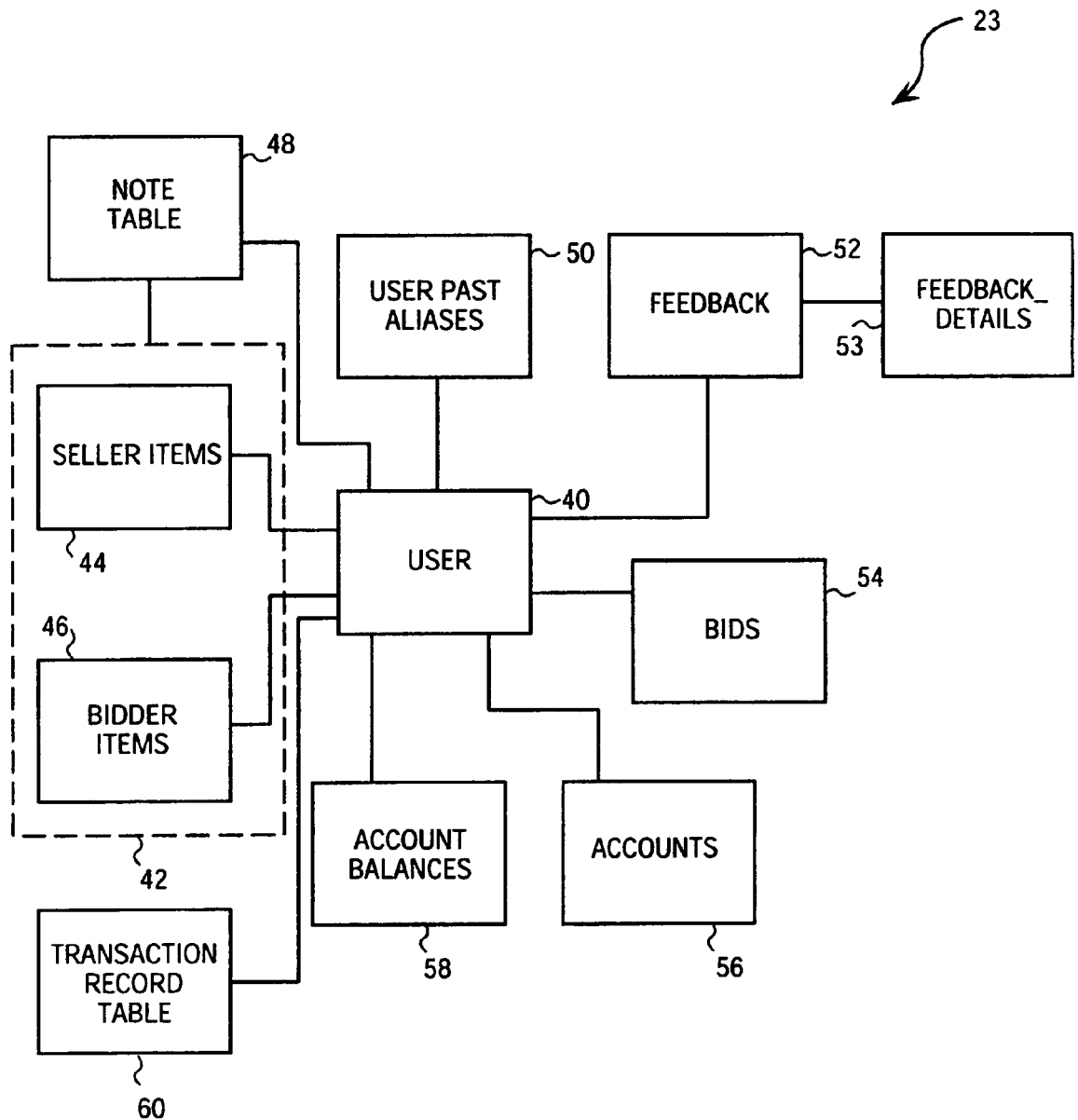
FIG. 2 is a database diagram illustrating an exemplary database for the transaction facility.

FIG. 2 is a database diagram illustrating an exemplary database 23, maintained by and accessed via the database engine server 22, which at least partially implements and supports the network-based transaction facility 10 such as an Internet-based auction facility. It should be noted that while some embodiments of the present invention are described in the context of an auction facility, it will be appreciated by those skilled in the art that the invention will find application in many different types of computer-based, and network-based, commerce facilities.

The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the network-based transaction facility 10 such as an Internet-based auction facility. A user may operate as a seller, buyer, or both, within the facility 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a buyer with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being offered via the facility 10, or to a user of the facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 3:
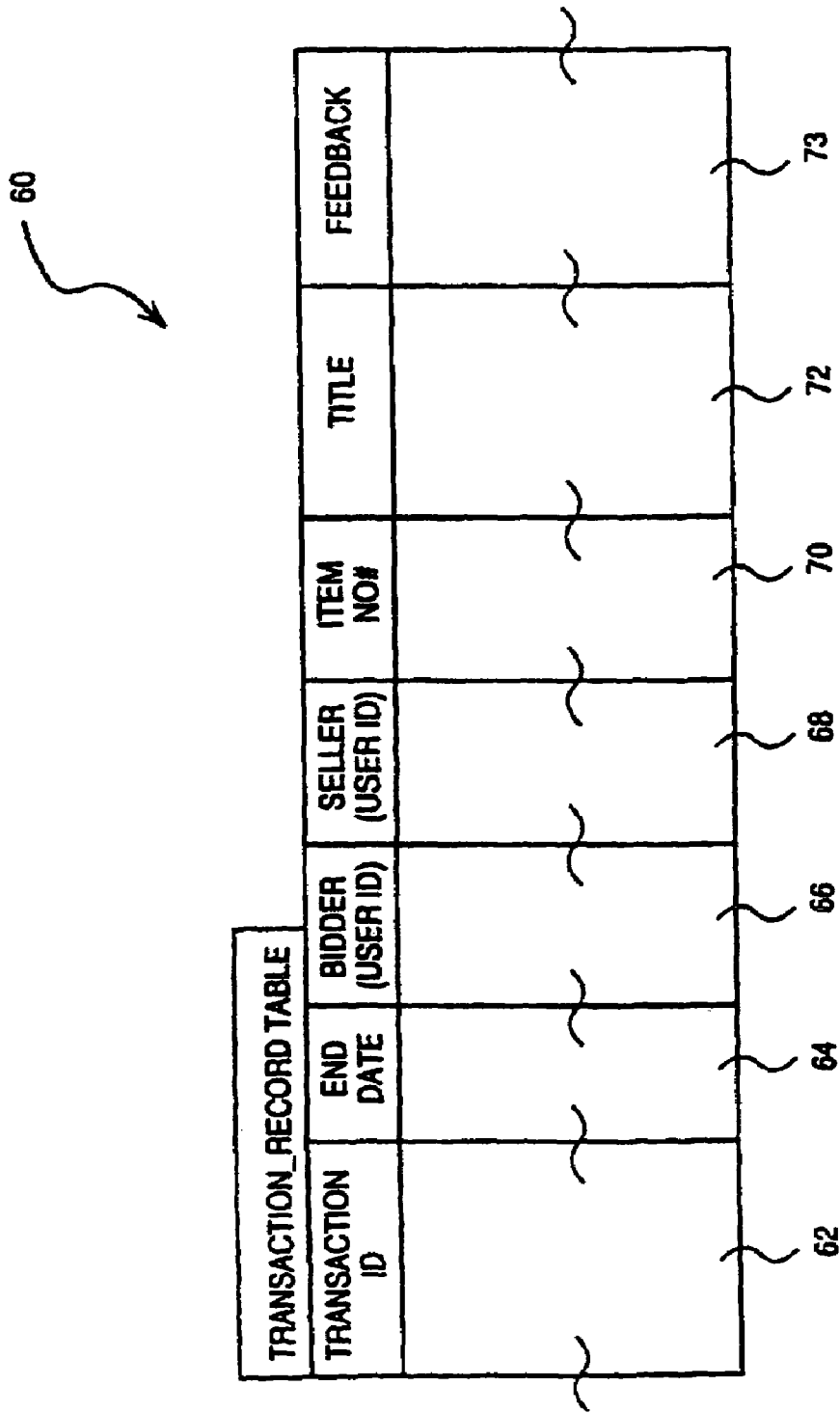
FIG. 3 is a diagrammatic representation of an exemplary transaction record table of the database illustrated in FIG. 2.

FIG. 3 is a diagrammatic representation of an exemplary embodiment of the transaction record table 60 that is populated with records, or entries, for completed, or ended, transactions (e.g., auctions) that have been facilitated by the facility 10. The table 60 includes a transaction identifier column 62 that stores a unique transaction identifier for each entry, and an end date column 64 that stores a date value indicating, for example, a date on which a transaction was established. A bidder column 66 stores a user identifier for a bidder (or a purchaser), the user identifier comprising a pointer to further user information stored in the user table 40. Similarly, a seller column 68 stores, for each entry, a user identifier for a seller within the relevant transaction. An item number column 70 stores, for each entry, an item number identifying the goods or service being transacted, and a title column 72 stores, for each entry, a descriptive title for the relevant transaction or for the item being transacted. A feedback column 73 stores, for each entry, data specifying whether feedback exists for the relevant transaction and whether this feedback is current (i.e., has not been cancelled).

It should be noted that, in one embodiment, an entry is only created in the transaction record table 60 for transactions that have been established, for example, by the conclusion of an auction process, or by some other offer and acceptance mechanism between the purchaser and the seller.

FIG. 4 is a diagrammatic representation of an exemplary embodiment of the feedback table 52. The feedback table 52 stores summary information regarding feedback for users of the facility 10. The table 52 includes a user identifier column 74 that stores, for each entry, a user identifier providing a pointer to the user table 40. A total score column 76 stores, for each user entry, a feedback score calculated by subtracting the total number of negative feedback comments received for the relevant user from the total number of positive feedback comments received for that user. A total negative column 78 stores, for each user entry, the total number of negative feedback comments for the relevant user, and a total positive column 80 similarly stores, for each user entry, the total number of positive feedback comments received for that user. A number of retractions column 82 stores, for each user entry, the number of bids that the relevant user has retracted from auctions.

FIG. 5 is a diagrammatic representation of one embodiment of the feedback details table 53, that is populated with entries reflecting the details of each feedback comment or opinion submitted by a user to the facility 10 regarding another user or item involved in a transaction. In one exemplary embodiment, users are only permitted to provide feedback pertaining to a transaction upon conclusion of that transaction. The feedback information may pertain to the other user that participated in the transaction, or to the object (e.g., goods or services) that was the subject of the transaction. In an alternative embodiment, comments or opinions are provided regarding an item or service that is offered for sale or regarding an event. In these cases it will be appreciated that a transaction is necessarily required for feedback to be permitted.

The feedback details table 53 includes an item number column 104 including an item identifier that points to a record within the item tables 42. A comment column 106 stores, for each entry, the actual text of the feedback, comment, or opinion. A type column 108, in one embodiment, stores indication as to whether the comment is positive, negative, neutral, or withdrawn. A date column 110 stores, for each entry, the date on which the feedback, comment or opinion was delivered. A response column 112 stores the text of a response submitted by a user (e.g., a user to which the original comment pertained) in response to the comment text stored in column 106. Similarly, a rebuttal column 114 stores the text of a rebuttal to such a response.

A feedback provider column 116 stores the user identifier of the user that submitted the original comment, stored in column 106, for the entry. A commentee column 118 stores the user identifier of the user to which comment may have been directed.

The feedback details table 53 also includes a withdrawal date column 120 that stores, for each withdrawn feedback comment, the date on which this feedback comment was withdrawn.

It will be appreciated that further dates and other descriptive information may also populate the feedback details table 53.

Feedback Cancellation

Users of the network-based transaction facility 10 are allowed to leave feedback for other users. Feedback provides users of the transaction facility 10 with a degree of confidence regarding a specific user. That is, a positive feedback history may establish the credibility and trustworthiness of a particular user within the transaction facility 10. Similarly, a history of negative feedback may discourage other users from transacting with a specific user. Sometimes, feedback left for a user may not be accurate. For example, a feedback provider may leave a positive feedback by mistake (e.g., a buyer may leave negative feedback to a wrong seller) or the parties to a transaction may have been able to resolve the problem after negative feedback was left. Embodiments of the present invention provide a mechanism for canceling feedback in the transaction facility 10.

Figure 6:
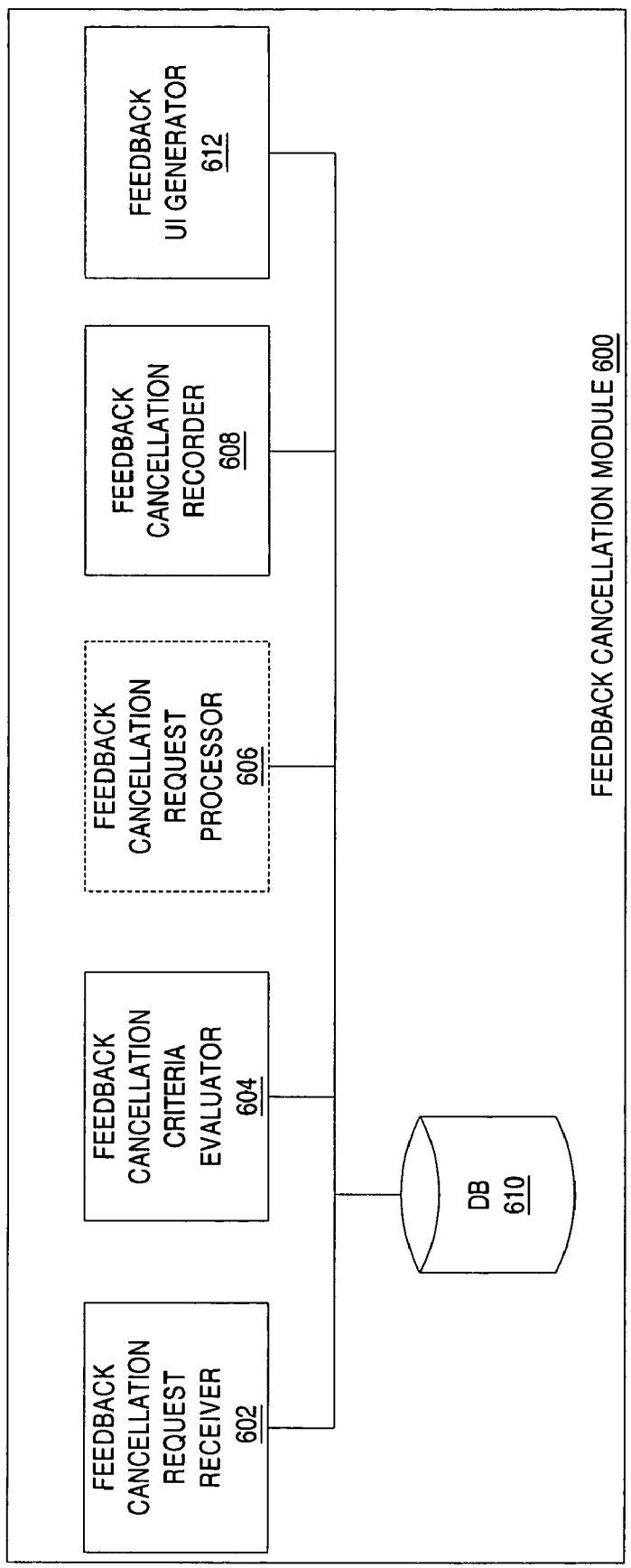
FIG. 6 is a block diagram of one embodiment of a feedback cancellation module.

In one embodiment, the transaction facility 10 contains a feedback cancellation module that is responsible for canceling feedback comments previously left by users of the transaction facility 10. FIG. 6 is a block diagram of one embodiment of a feedback cancellation module 600.

Referring to FIG. 6, the feedback cancellation module 600 includes a feedback cancellation request receiver 602, a feedback cancellation criteria evaluator 604, a feedback cancellation request processor 606, a feedback cancellation recorder 608, a feedback user interface (UI) generator 612, and a database 610. The feedback cancellation request receiver 602 is responsible for receiving a request to cancel feedback from a first user, identifying a transaction associated with the feedback and identifying a second user who was the second party to the transaction. The feedback to be cancelled may include feedback comments left by the first and second users for the relevant transaction. In one embodiment, the transaction is identified using an item number specified by the first user when submitting the request.

The feedback cancellation criteria evaluator 604 is responsible for evaluating information pertaining to the current feedback cancellation request based on a set of feedback cancellation criteria that encompass various rules for canceling feedback in the transaction facility 10. The rules may require, for example, that at least one feedback comment be associated with the relevant transaction, that the request to cancel feedback be received before an expiration date of the transaction, that each party to the transaction be currently registered with the transaction facility 10, that the feedback cancellation request be below a threshold number of allowed feedback cancellations for each party to the transaction, etc. In one embodiment, the rules require that at least one party agree to cancel feedback.

In another embodiment, the rules require that both parties agree to cancel feedback. In this embodiment, the feedback cancellation module 600 also includes a feedback cancellation request processor 606 that is responsible for determining whether the second party agrees to cancel feedback for the relevant transaction. In one embodiment, this determination is made by notifying the second party about the request, presenting to the second party information identifying the relevant transaction and feedback left for this transaction, and receiving a confirmation of feedback cancellation from the second party.

The feedback cancellation recorder 608 is responsible for canceling the feedback if the feedback cancellation criteria are satisfied. In one embodiment, the feedback cancellation recorder 608 cancels the feedback by marking each relevant feedback comment as withdrawn (e.g., by recording the withdrawal date in the feedback details table 53), updating feedback scores (e.g., total score 76, total negative 78 and total positive 80 in the feedback table 52), and marking the transaction as having withdrawn feedback (e.g., in the feedback column 73 of the transaction record table 60).

The feedback UI generator 612 is responsible for generating various UI's that present feedback information to the users. In one embodiment, when a user requests to see all feedback left for some other user, cancelled feedback (if any) is displayed with a comment indicating that this feedback has been withdrawn.

Figure 7:
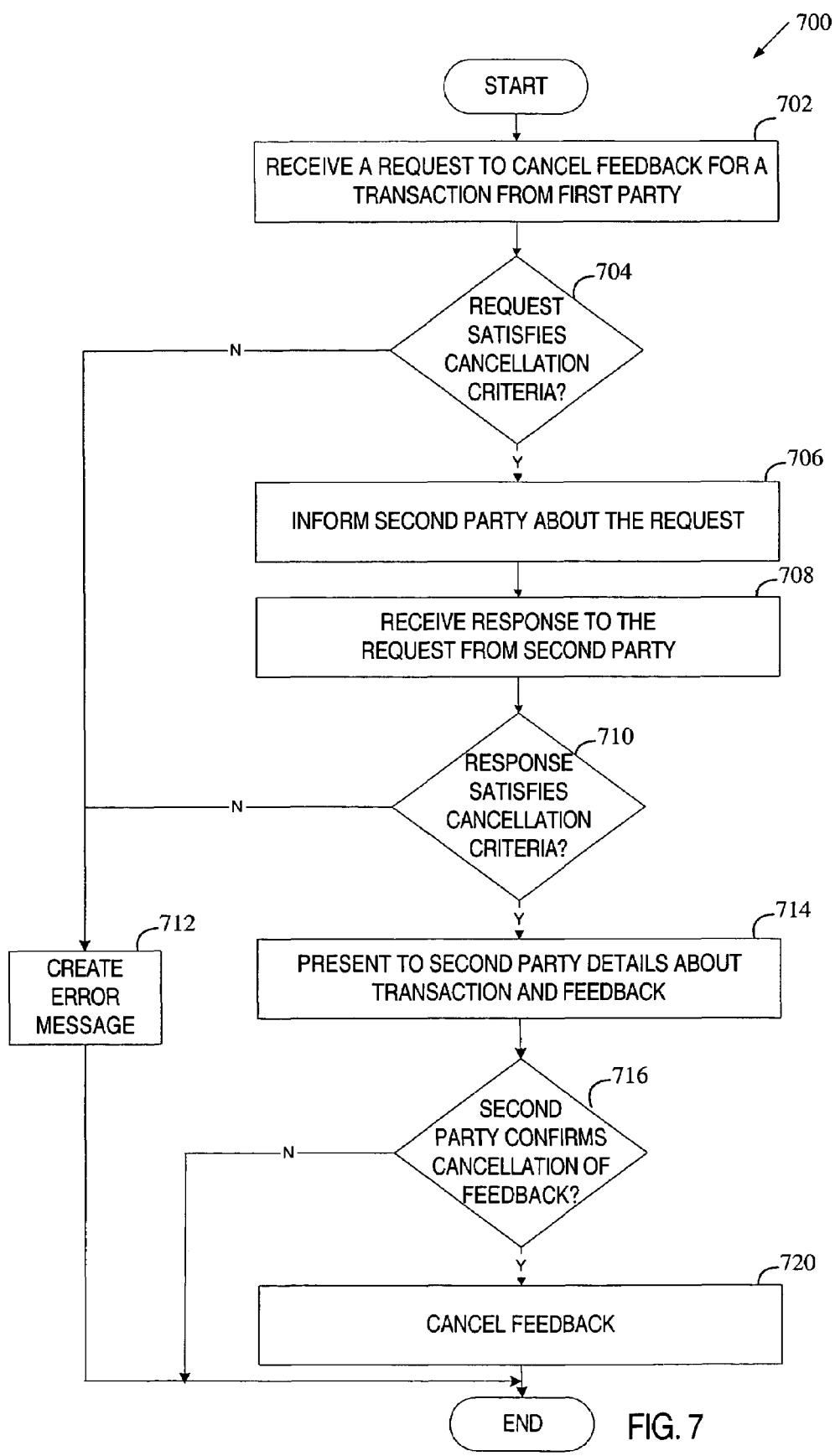
FIGS. 7-9 are flow diagrams of exemplary methods performed by the feedback cancellation module.

FIG. 7 is a flow diagram of one embodiment of method 700 for canceling feedback in a network-based transaction facility. The method may be performed by the feedback cancellation module 600, which may be implemented in hardware, software, or a combination of both.

Referring to FIG. 7, method 700 begins with the feedback cancellation request receiver 602 receiving a request to cancel feedback from a first user (processing block 702). In one embodiment, the request includes an item identifier that links the request to a specific transaction. In addition, the feedback cancellation request receiver 602 may use the item number to determine the other party to the transaction and to retrieve all feedback comments provided for this transaction. These feedback comments may be left by the first party and/or the second party.

At processing block 704, the feedback cancellation criteria evaluator 604 determines whether the feedback cancellation request of the first party satisfies a set of feedback cancellation criteria. As discussed above, the set of feedback cancellation criteria are based on rules that may require, for example, that at least one feedback comment be associated with the relevant transaction, that the request to cancel feedback be received before an expiration date of the transaction, that each party to the transaction be currently registered with the transaction facility 10, that the feedback cancellation request be below a threshold number of allowed feedback cancellations for each party to the transaction, etc.

If the feedback cancellation request of the first party does not satisfy any of the feedback cancellation criteria, the criteria evaluator 604 creates an error message identifying the problem (processing block 712). If the feedback cancellation request of the first party satisfies all of the feedback cancellation criteria, the feedback cancellation request processor 606 informs the second party of the feedback cancellation request (processing block 706). In one embodiment, the feedback cancellation request processor 606 sends to the second party an email specifying the request and identifying the relevant transaction and feedback left for this transaction. The email may also include a link to a feedback cancellation form that the second party needs to access in order to proceed with the request. In other embodiments, the second party may be notified about the request of the first party using different communication means (e.g., a letter, a voice message, etc.).

At processing block 708, the feedback cancellation request processor 606 receives from the second party a response to the feedback cancellation request. In one embodiment, the response includes an item number that links the response to the feedback cancellation request of the first party, and a request of the second party to view detailed information about the relevant transaction.

At processing block 710, the feedback cancellation criteria evaluator 604 determines whether the response of the first party satisfies the feedback cancellation criteria. For example, the feedback cancellation criteria evaluator 604 may determine whether the response is received before the expiration date of the transaction, that each party to the transaction is currently registered with the transaction facility 10, etc.

If the response of the second party does not satisfy any of the feedback cancellation criteria, the criteria evaluator 604 creates an error message identifying the problem (processing block 712). If the response of the second party satisfies all of the feedback cancellation criteria, the feedback UI generator 612 presents to the second party information about the transaction and feedback comments left for this transaction (processing block 714).

At processing block 716, the feedback cancellation request processor 606 determines whether the second party confirms the cancellation of the feedback based on the input provided by the second party. If not, method 700 ends. If so, the feedback cancellation request processor 606 causes the feedback cancellation recorder 608 to cancel the feedback (processing block 720). In one embodiment, the feedback is cancelled by marking each relevant feedback comment as withdrawn, recalculating feedback scores and statistics of both parties, and marking the transaction as having withdrawn feedback to prevent the party who has not yet provided feedback from leaving new feedback.

Figure 8:
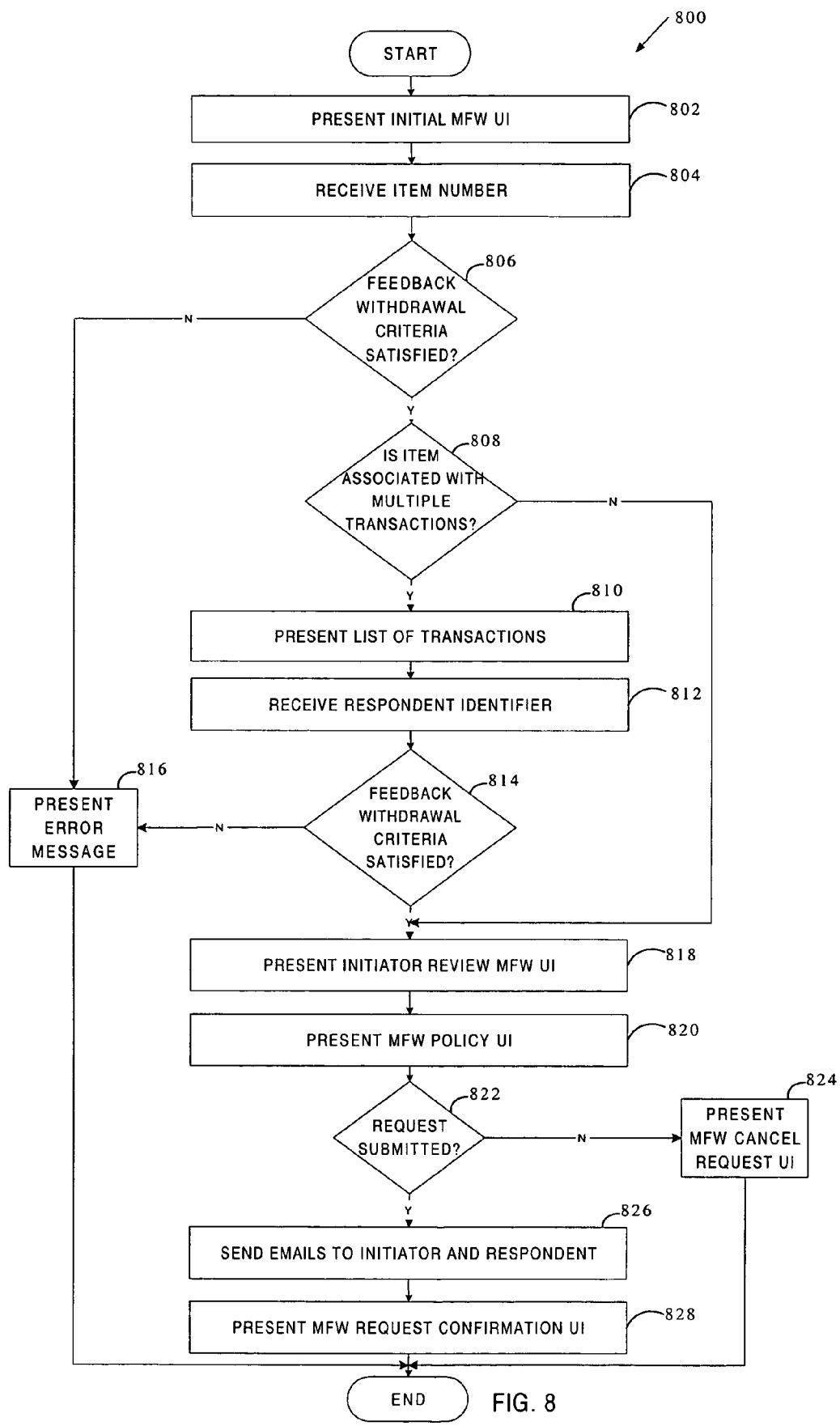

In one embodiment, method 700 performed by the feedback cancellation module 600 is divided into an initiator process that is based on interactions with the first party (referred to as a mutual feedback withdrawal (MFW) initiator) and a respondent process that is based on interactions with the second party (referred to as a MFW respondent). FIG. 8 is a flow diagram of one embodiment of a method 800 for performing an exemplary MFW initiator process. Method 800 may be performed by the feedback cancellation module 600, which may be implemented in hardware, software, or a combination of both. Method 800 is discussed with reference to exemplary UIs created by the feedback UI generator 612 and illustrated in FIGS. 10-15B.

Referring to FIG. 8, method 800 begins with the feedback UI generator 612 presenting an initial MFW UI to the first party (processing block 802). An exemplary initial MFW UI is shown in FIG. 10.

At processing block 804, the feedback cancellation request receiver 602 receives an item number provided by the first party via the initial MFW UI and attempts to identify the transaction and the second party to the transaction based on the item number. If the item number is associated with multiple transactions and multiple second parties (e.g., the first party is a seller who has multiple buyers of the same item), the feedback cancellation request receiver 602 determines that further identification of the transaction is required and retrieves information pertaining to the multiple transactions from the database 610. Alternatively, if the item number is associated with a single transaction, the feedback cancellation request receiver 602 retrieves information about this transaction from the database 610.

At processing block 806, the criteria evaluator 604 determines whether the feedback withdrawal criteria are satisfied. Table 1 illustrates exemplary feedback withdrawal criteria used by the criteria evaluator 604.

TABLE 1

| Order | Criteria | Condition | Error Message |
| --- | --- | --- | --- |
| 1 | Was an item number entered? | Return error if FALSE | Please enter a valid item number. |
| 2 | Is the user signed in and not suspended? | Require sign-in | |
| 3 | Is this a valid item number? | Return error if FALSE | Please enter a valid item number. |
| 4 | Did the user participate in this transaction? | Return error if FALSE | You are not involved in this transaction. |
| 5 | Does a specific transaction need to be identified? (multi-transaction) | Skip to multi-transaction logic | |
| 6 | Has feedback already been withdrawn for this transaction? | Return error if TRUE | Feedback for this transaction has already been withdrawn. |
| 6a | Did either party leave feedback for this transaction? | Return error if FALSE | At least one trading partner must leave feedback for this transaction before it can be withdrawn. |
| 7 | Less than 90 days since trxn end or less than 30 days since either party feedback left for this transaction? (does not include reply or follow-ups) | Return error if FALSE | This transaction is past the expiry date for a feedback withdrawal request. |

TABLE 1-continued

| Order | Criteria | Condition | Error Message |
| --- | --- | --- | --- |
| 8 | Is the other party in transaction NARU? | Return error if TRUE | The request cannot be completed as the other party in this transaction is no longer a registered user. |
| 9 | MFW request already filed for this transaction? | Return error if TRUE | You have already requested feedback withdrawal for this transaction. |
| 10 | Is this user over their usage limit? | Return error if TRUE | You can request withdrawal for only 15 transactions during a 30-day period. |
| 11 | Has the other party already filed for MFW on this item? | User sees respondent flow if TRUE. | |

Figure 11A:
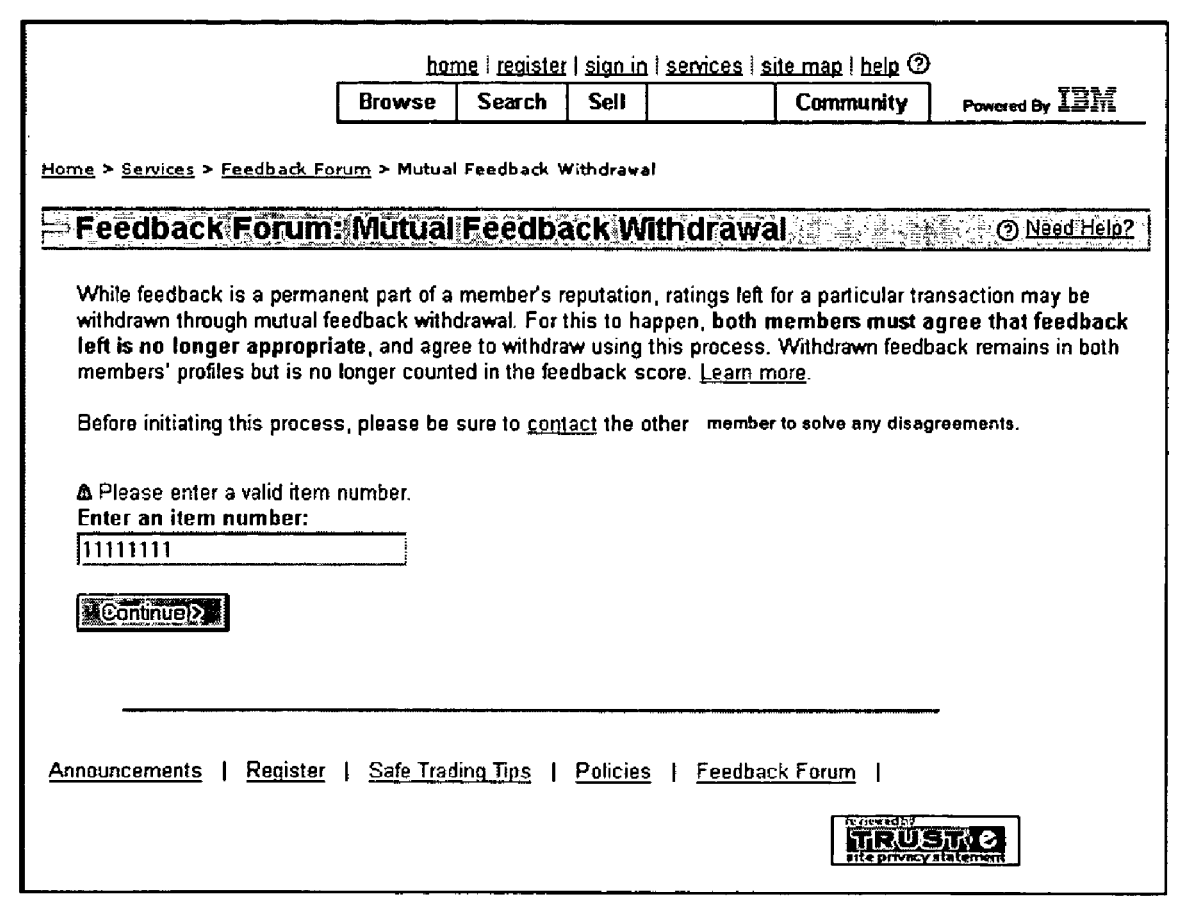
Figure 11B:
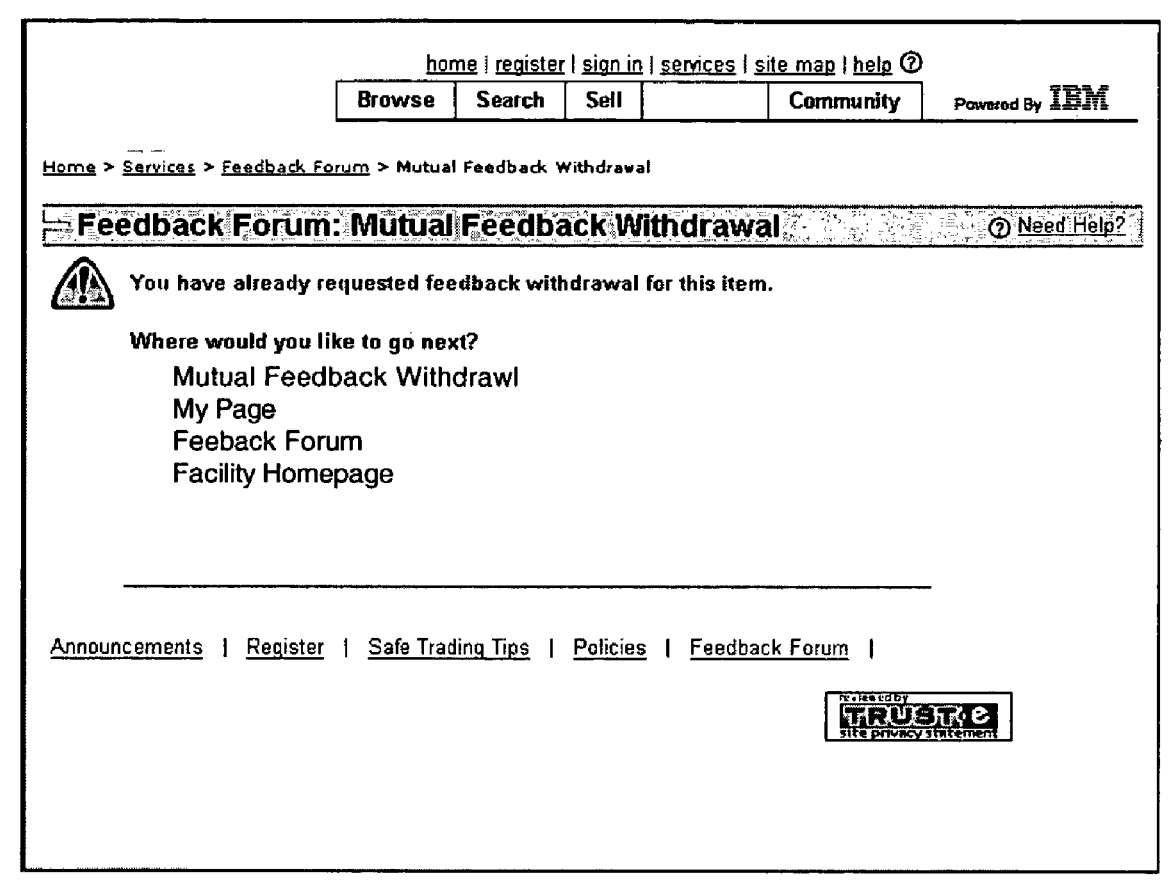

If any of the feedback withdrawal criteria are not satisfied, the feedback UI generator 612 displays an error messages (processing block 816). Examples of error messages are included in Table 1. FIGS. 11A and 11B illustrate exemplary UIs that present error messages to the user.

Figure 12:
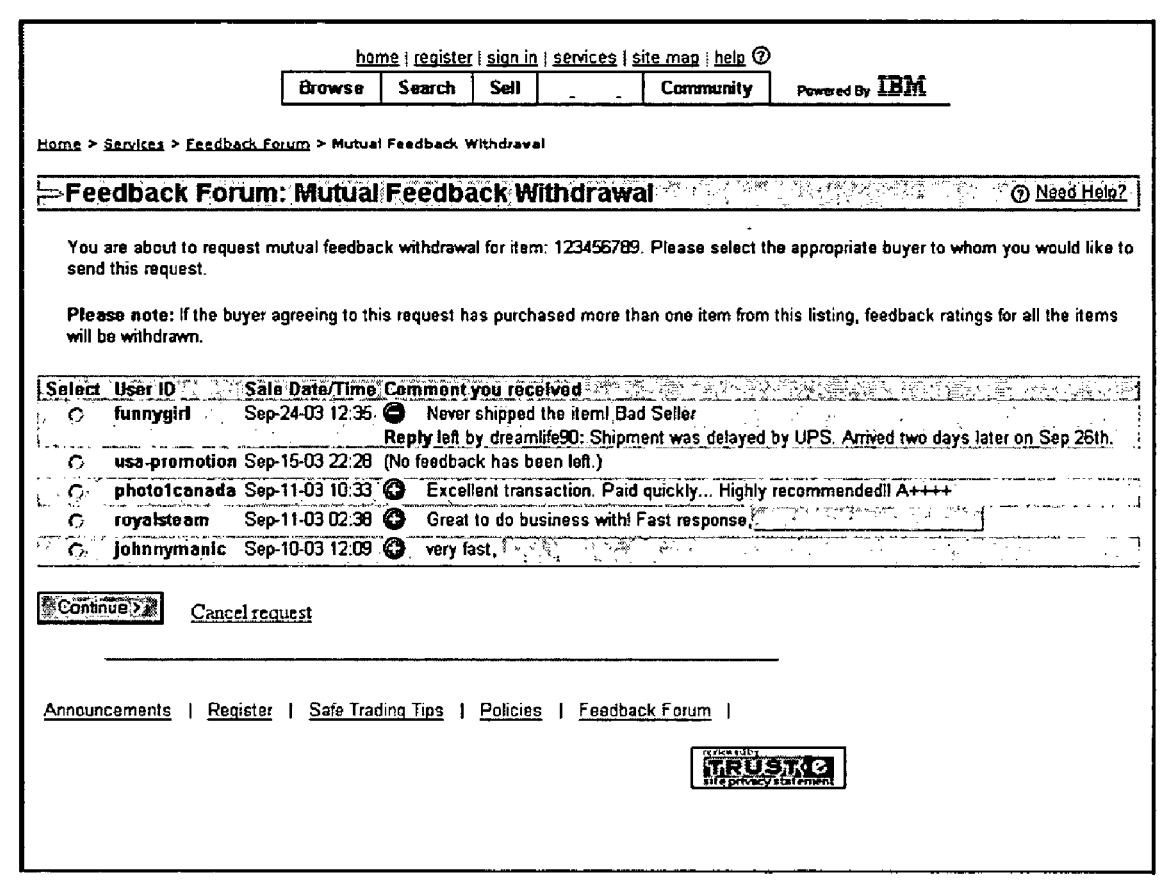

If all of the feedback withdrawal criteria are satisfied and the item number is associated with multiple transactions (processing block 808), the feedback UI generator 612 presents to the first party a multi-item MFW UI containing a list of transactions (processing block 810). FIG. 12 illustrates an exemplary multi-item MFW UI that facilitates user selection of a specific transaction.

Upon receiving an identifier of the second party (the respondent) (processing block 812), the criteria evaluator 604 determines whether the feedback withdrawal criteria are satisfied (processing block 814). Table 2 illustrates exemplary feedback withdrawal criteria used by the criteria evaluator 604 for the multi-transaction items.

TABLE 2

| Order | Criteria | Condition | Error Message |
| --- | --- | --- | --- |
| 1M | Was a transaction selected? | Return error if FALSE | Please select a transaction. |
| 2M | Is the user signed in and not suspended? | Require sign-in | |
| 6M | Has feedback already been withdrawn for this transaction? | Return error if TRUE | Feedback for this transaction has already been withdrawn. |
| 6MA | Did either party leave feedback for this transaction? | Return error if FALSE | At least one trading partner must leave feedback for this transaction before it can be withdrawn. |
| 7M | Less than 90 days since trxn end or less than 30 days since either party feedback left for this transaction? (does not include reply or follow-ups) | Return error if FALSE | This transaction is past the expiry date for a feedback withdrawal request. |
| 8M | Is the other party in transaction NARU? | Return error if TRUE | The request cannot be completed as the other party in this transaction is no longer a registered user. |
| 9M | MFW request already filed for this transaction? | Return error if TRUE | You have already requested feedback withdrawal for this transaction. |

TABLE 2-continued

| Order | Criteria | Condition | Error Message |
|---|---|---|---|
| 10M | Is this user over their usage limit? | Return error if TRUE | You can request withdrawal for only 15 transactions during a 30-day period. |
| 11M | Has the other party already filed for MFW on this item? | User sees respondent flow if TRUE. | |

Figure 13A:

If any of the feedback withdrawal criteria are not satisfied, the feedback UI generator 612 displays an error messages (processing block 816). If all of the feedback withdrawal criteria for the multi-transaction items are satisfied or the item is associated with a single transaction (processing block 808), the feedback UI generator 612 presents to the first party an initiator review MFW UI that provides information about the transaction and feedback left for this transaction (processing block 818). FIG. 13A illustrates an exemplary initiator review MFW UI.

In one embodiment, if the first and second parties have multiple transactions for the same item, the feedback for each of those transactions is to be withdrawn at the same time and information for each of those transactions is included in the initiator review MFW UI as illustrated in FIG. 13B.

If the first party decides to proceed further with feedback cancellation, the feedback UI generator 612 presents to the first party a MFW policy UI that provides information about feedback cancellation rules in the transaction facility 10 (processing block 820). FIG. 14 illustrates an exemplary MFW policy UI.

If the first party confirms the request to cancel feedback (processing block 822), the feedback cancellation request processor 606 sends emails to the first party confirming the request and to second party notifying about the request (processing block 826). FIGS. 21 and 22 illustrate exemplary emails sent to the first and second parties respectively.

In addition, the feedback UI generator 612 presents a MFW request confirmation UI to the first party (processing block 828). FIG. 15A illustrates an exemplary MFW request confirmation UI.

If the first party does not confirm the request to cancel feedback (processing block 822), the feedback UI generator 612 presents a MFW request cancellation UI to the first party (processing block 824). FIG. 15B illustrates an exemplary MFW request cancellation UI.

Figure 9:
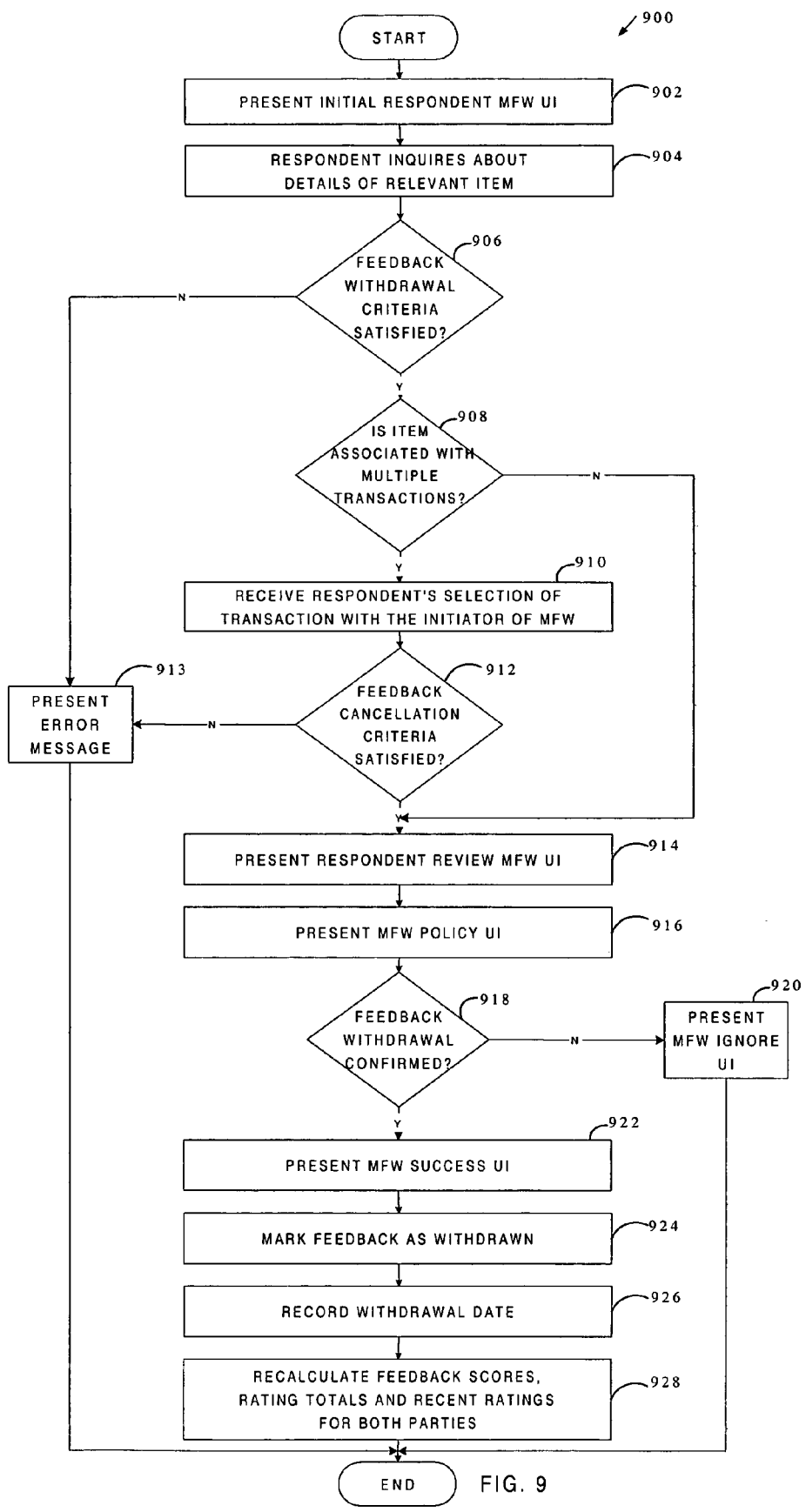

FIG. 9 is a flow diagram of one embodiment of a method 900 for performing an exemplary MFW respondent process. Method 900 may be performed by the feedback cancellation module 600, which may be implemented in hardware, software, or a combination of both. Method 900 is discussed with reference to exemplary UIs created by the feedback UI generator 612 and illustrated in FIGS. 16-20.

Referring to FIG. 9, method 900 begins with the feedback UI generator 612 presenting an initial respondent MFW UI to the second party (processing block 902). An exemplary initial respondent MFW UI is shown in FIG. 16. If the second party accesses the initial respondent MFW UI via email, the item number is included in the UI as illustrated in FIG. 16. Alternatively, the second party is requested to enter the item number.

When the second party asks for details of the relevant transaction (processing block 904), the criteria evaluator 604 determines whether the feedback withdrawal criteria are satisfied (processing block 906). Exemplary feedback withdrawal criteria used by the criteria evaluator 604 are illustrated in Table 1.

Figure 17:
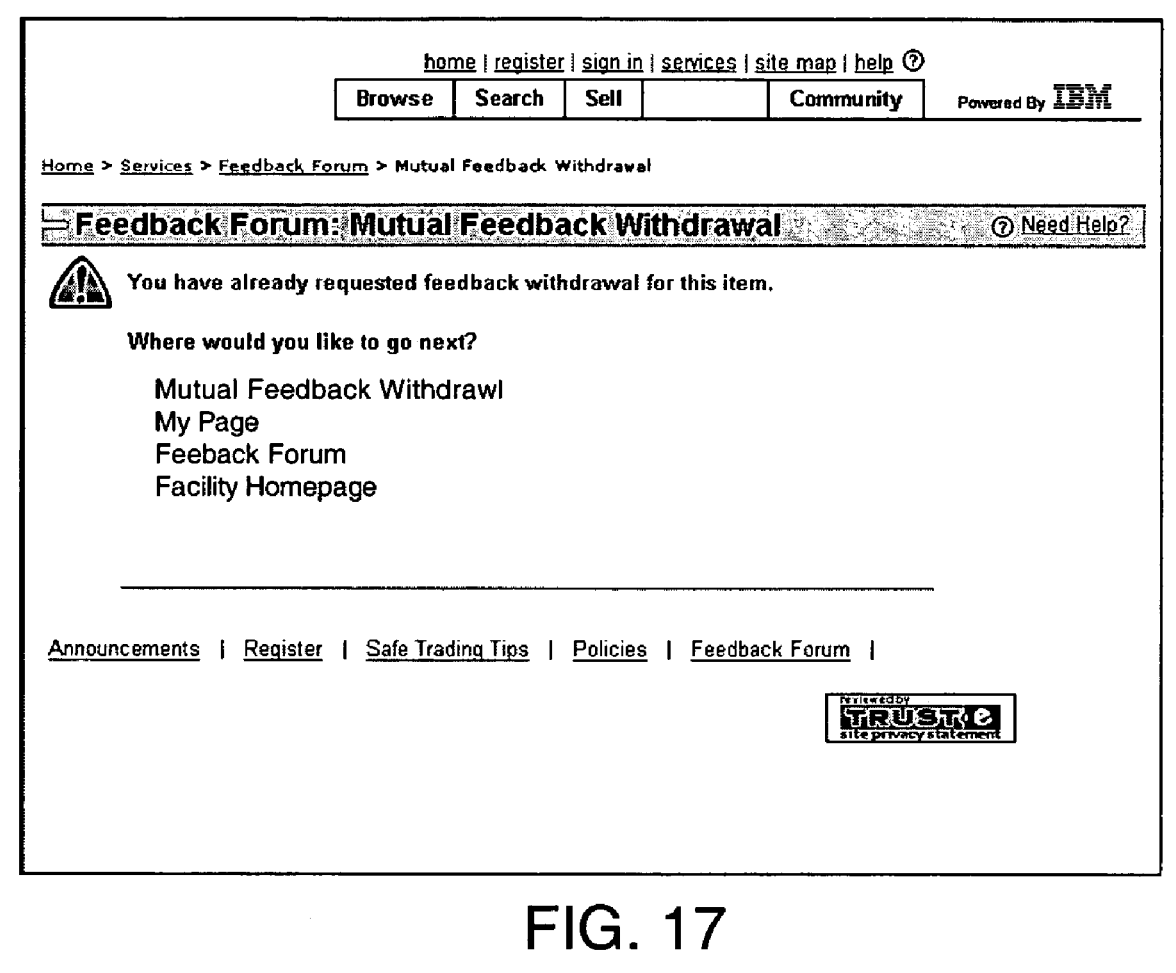

If any of the feedback withdrawal criteria are not satisfied, the feedback UI generator 612 displays an error messages (processing block 913). Examples of error messages are included in Table 1. FIG. 17 illustrates an exemplary UI that presents an error message to the user.

If all of the feedback withdrawal criteria are satisfied and the item number is associated with multiple transactions (processing block 908), the feedback UI generator 612 presents to the second party a multi-item MFW UI containing a list of transactions to the first party, as illustrated in FIG. 12.

Upon receiving an identifier of the transaction from the second party (processing block 910), the criteria evaluator 604 determines whether the feedback withdrawal criteria are satisfied (processing block 912). Table 2 illustrates exemplary feedback withdrawal criteria used by the criteria evaluator 604 for the multi-transaction items.

If any of the feedback withdrawal criteria are not satisfied, the feedback UI generator 612 displays an error messages (processing block 913). If all of the feedback withdrawal criteria for the multi-transaction items are satisfied or the item is associated with a single transaction (processing block 908), the feedback UI generator 612 presents to the second party a respondent review MFW UI that provides information about the transaction and feedback left for this transaction (processing block 914). FIG. 18 illustrates an exemplary respondent review MFW UI.

If the second party decides to proceed further with feedback cancellation, the feedback UI (processing block 916) generator 612 presents to the second party a MFW policy UI that provides information about feedback cancellation rules in the transaction facility 10 as illustrated in FIG. 14.

Figure 20:
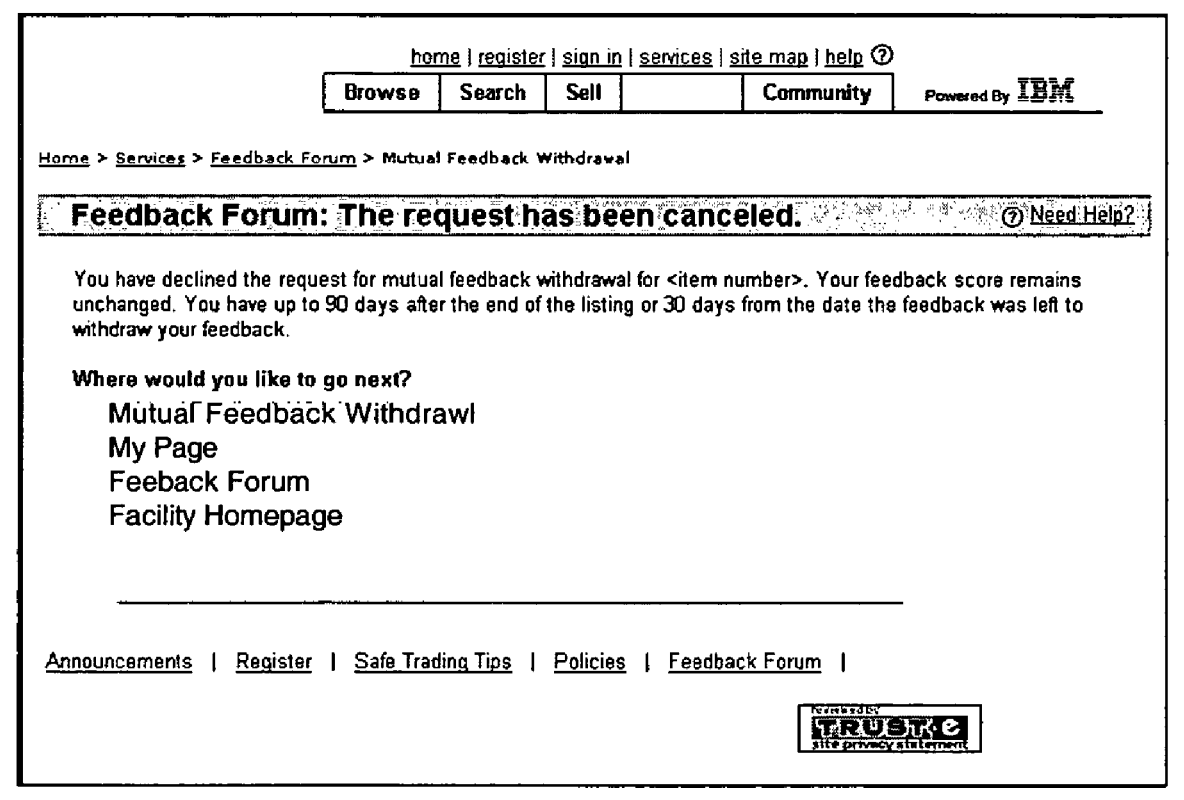

If the second party does not confirm the request to cancel feedback (processing block 918), the feedback UI generator 612 presents a MFW request cancellation UI to the second party (processing block 920). FIG. 20 illustrates an exemplary MFW request cancellation UI.

If the second party confirms the withdrawal of feedback (processing block 918), the feedback cancellation request processor 606 sends an email to the first party confirming that the request has been successfully completed. FIG. 23 illustrates an exemplary email sent to the first party. In addition, the feedback UI generator 612 presents a MFW success UI to the second party (processing block 922). FIG. 19 illustrates an exemplary MFW success UI.

Afterwards, the feedback cancellation recorder 608 marks feedback left for the relevant transaction as withdrawn (processing block 924), records the withdrawal date for each relevant feedback comment (processing block 926), and re-calculates feedback scores, rating totals and recent ratings for both parties (processing block 928).

Subsequently, if any user of the transaction facility 20 requests to view feedback left either for the first or second party, the feedback UI generator 612 presents a feedback review UI that identifies withdrawn feedback comments. FIG. 24 illustrates an exemplary feedback review UI that identifies withdrawn feedback 2402, provides the number 2404 of withdrawn comments, and ratings and statistics 2406 reflecting the withdrawn comments.

Computer System

Figure 25:
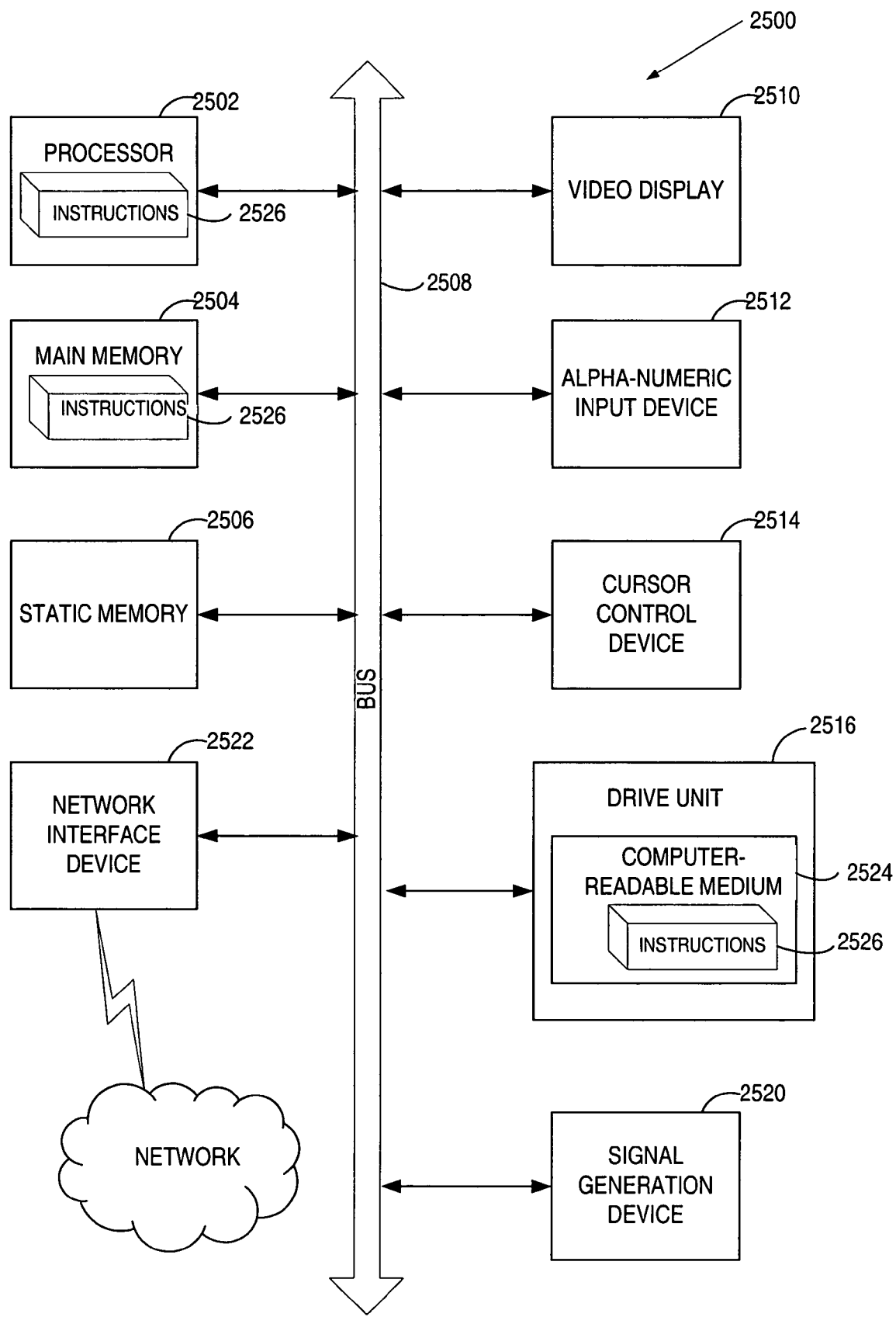
FIG. 25 is a block diagram of an exemplary computer system that may used to practice embodiments of the present invention.

FIG. 25 shows a diagrammatic representation of a machine in the exemplary form of a computer system 2500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2500 includes a processor 2502, a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alpha-numeric input device 2512 (e.g. a keyboard), a cursor control device 2514 (e.g. a mouse), a disk drive unit 2516, a signal generation device 2520 (e.g. a speaker) and a network interface device 2522.

The disk drive unit 2516 includes a machine-readable medium 2524 on which is stored a set of instructions (i.e., software) 2526 embodying any one, or all, of the methodologies described above. The software 2526 is also shown to reside, completely or at least partially, within the main memory 2504 and/or within the processor 2502. The software 2526 may further be transmitted or received via the network interface device 2522. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks.

Thus, a method and system for canceling feedback in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   a processor;
   a memory in data communication with the processor;
   a feedback cancellation request receiver, executable by the processor, to receive a request to cancel feedback pertaining to a transaction in a network-based transaction facility from a first party to the transaction;
   a feedback cancellation criteria evaluator, executable by the processor, to automatically determine whether one or more feedback cancellation criteria are satisfied;
   a feedback cancellation recorder, executable by the processor, to cancel the feedback pertaining to the transaction if the one or more feedback cancellation criteria are satisfied, the feedback cancellation recorder further to mark the feedback pertaining to the transaction as withdrawn; and
   a feedback user interface generator, executable by the processor, to generate a user interface that presents the feedback pertaining to the transaction and an indication that the feedback pertaining to the transaction is withdrawn.

2. The apparatus of claim 1 further comprising:
   a feedback cancellation request module, executable by the processor, to determine that a second party to the transaction agrees to cancel the feedback pertaining to the transaction.

3. The apparatus of claim 2 wherein the feedback cancellation request module is to determine that the second party agrees to cancel the feedback by presenting to the second party information identifying the transaction for which the first party submitted the request to cancel feedback, and receiving a confirmation of feedback cancellation from the second party.

4. The apparatus of claim 1 wherein the feedback pertaining to the transaction includes at least one of a feedback comment left by the first party for a second party to the transaction and a feedback comment left by the second party for the first party.

5. The apparatus of claim 1 wherein the feedback cancellation request receiver is further to identify a second party to the transaction based on input provided by the first party, to present to the first party information identifying the second party and the feedback pertaining to the transaction, and to receive a confirmation of the request to cancel feedback from the first party.

6. The apparatus of claim 5 wherein the input provided by the first party includes an identifier of an item associated with the transaction.

7. The apparatus of claim 1 further comprising:
   a feedback cancellation request module, executable by the processor, to notify a second party to the transaction about the request to cancel feedback.

8. The apparatus of claim 1 wherein the one or more feedback cancellation criteria includes at least one requirement selected from the group consisting of a requirement that at least one feedback comment pertaining to the transaction exist, a requirement that the request to cancel feedback be received before an expiration date of the transaction, a requirement that a second party to the transaction agree to cancel feedback before an expiration date of the request to cancel feedback, a requirement that each of the first and second parties be currently registered with the network-based transaction facility, and a requirement that each of the first and second parties do not exceed a feedback cancellation limit.

9. A computer-implemented method to cancel feedback pertaining to a transaction in a network-based marketplace, the method comprising:
   receiving a request to cancel feedback pertaining to the transaction in a network-based transaction facility from a first party to the transaction, the request being received via a digital network interface for processing by a data processor;
   using the data processor to automatically determine whether one or more feedback cancellation criteria are satisfied;
   canceling the feedback pertaining to the transaction, the canceling of the feedback pertaining to the transaction including marking the feedback pertaining to the transaction as withdrawn; and
   generating a user interface for a computer system, the user interface presenting the feedback pertaining to the transaction and an indication that the feedback pertaining to the transaction is withdrawn.

10. The computer-implemented method of claim 9 further comprising:
    determining that a second party to the transaction agrees to cancel the feedback pertaining to the transaction.

11. The computer-implemented method of claim 10 wherein determining that the second party agrees to cancel the feedback comprises:
    presenting to the second party information identifying the transaction for which the first party submitted the request to cancel feedback; and receiving a confirmation of feedback cancellation from the second party.

12. The computer-implemented method of claim 9 wherein the feedback pertaining to the transaction includes at least one of a feedback comment left by the first party for a second party to the transaction and a feedback comment left by the second party for the first party.

13. The computer-implemented method of claim 9 further comprising:
identifying a second party to the transaction based on input provided by the first party;
presenting to the first party information identifying the second party and the feedback pertaining to the transaction; and
receiving a confirmation of the request to cancel feedback from the first party.

14. The computer-implemented method of claim 13 wherein the input provided by the first party includes an identifier of an item associated with the transaction.

15. The computer-implemented method of claim 14 wherein identifying the second party comprises:
determining that the item is associated with a plurality of transactions;
presenting to the first party one or more users participating in the plurality of transactions; and
requesting the first party to specify which of the one or more users is the second party.

16. The computer-implemented method of claim 9 further comprising:
notifying a second party to the transaction about the request to cancel feedback.

17. The computer-implemented method of claim 16 wherein notifying the second party comprises:
sending to the second party an email message informing the second party of the request to cancel feedback pertaining to the transaction.

18. The computer-implemented method of claim 17 wherein the email message sent to the second party includes a link to a feedback cancellation form.

19. The computer-implemented method of claim 9 further comprising:
upon receiving a request for feedback left for any one of the first party and a second party to the transaction, displaying one or more feedback comments pertaining to the transaction with a feedback withdrawal comment.

20. The computer-implemented method of claim 9 further comprising:
preventing any of the first party and a second party to the transaction from entering feedback comments for the transaction upon canceling the feedback pertaining to the transaction.

21. The computer-implemented method of claim 9 wherein the one or more feedback cancellation criteria includes at least one requirement selected from the group consisting of a requirement that at least one feedback comment pertaining to the transaction exist, a requirement that the request to cancel feedback be received before an expiration date of the transaction, a requirement that a second party to the transaction agree to cancel feedback before an expiration date of the request to cancel feedback, a requirement that each of the first and second parties be currently registered with the network-based transaction facility, and a requirement that each of the first and second parties do not exceed a feedback cancellation limit.

22. A computer readable medium comprising instructions, which when executed on a processor, cause the processor to perform a method comprising:
receiving a request to cancel feedback pertaining to a transaction in a network-based transaction facility from a first party to the transaction;
automatically determining whether one or more feedback cancellation criteria are satisfied; and
canceling the feedback pertaining to the transaction if the one or more feedback cancellation criteria are satisfied, the canceling of the feedback pertaining to the transaction including marking the feedback pertaining to the transaction as withdrawn; and generating a user interface that presents the feedback pertaining to the transaction and an indication that the feedback pertaining to the transaction is withdrawn.

23. The computer readable medium of claim 22 wherein the method further comprises:
determining that a second party to the transaction agrees to cancel the feedback pertaining to the transaction.

24. The computer readable medium of claim 22 wherein the feedback pertaining to the transaction includes at least one of a feedback comment left by the first party for a second party to the transaction and a feedback comment left by the second party for the first party.

25. The computer readable medium of claim 22 wherein the method further comprises:
identifying a second party to the transaction based on input provided by the first party;
presenting to the first party information identifying the second party and the feedback pertaining to the transaction; and
receiving a confirmation of the request to cancel feedback from the first party.

26. The computer readable medium of claim 22 wherein the one or more feedback cancellation criteria includes at least one requirement selected from the group consisting of a requirement that at least one feedback comment pertaining to the transaction exist, a requirement that the request to cancel feedback be received before an expiration date of the transaction, a requirement that a second party to the transaction agree to cancel feedback before an expiration date of the request to cancel feedback, a requirement that each of the first and second parties be currently registered with the network-based transaction facility, and a requirement that each of the first and second parties do not exceed a feedback cancellation limit.

* * * * *

UNITED STATES PATENT AND TRADEMARK OFFICE
CERTIFICATE OF CORRECTION

PATENT NO. : 7,716,079 B2 Page 1 of 1
APPLICATION NO. : 10/749736
DATED : May 11, 2010
INVENTOR(S) : Amjad Hanif et al.

It is certified that error appears in the above-identified patent and that said Letters Patent is hereby corrected as shown below:

Title page 2, in column 2, under "Other Publications", line 11, delete "Prelimiary" and insert -- Preliminary --, therefor.

Title page 2, in column 2, under "Other Publications", line 56, delete "Managment," and insert -- Management, --, therefor.

On Sheet 15 of 27, in Serial No. 5, in Figure 14, line 1, delete "oth" and insert -- other --, therefor.

On Sheet 15 of 27, in Serial No. 5, in Figure 14, line 1, delete "delcines" and insert -- declines --, therefor.

In column 5, line 51, delete "U's" and insert -- UIs --, therefor.

In column 14, line 16, in Claim 22, after "satisfied;" delete "and".

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,716,079 B2 | Page 1 of 1 |
| APPLICATION NO. | : 10/749736 | |
| DATED | : May 11, 2010 | |
| INVENTOR(S) | : Hanif et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this
Twenty-second Day of February, 2011

David J. Kappos
*Director of the United States Patent and Trademark Office*